United States Patent
Honda

(10) Patent No.: US 7,221,789 B2
(45) Date of Patent: May 22, 2007

(54) METHOD FOR PROCESSING AN IMAGE CAPTURED BY A CAMERA

(75) Inventor: Kanako Honda, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 729 days.

(21) Appl. No.: 10/643,794

(22) Filed: Aug. 19, 2003

(65) Prior Publication Data

US 2004/0057601 A1 Mar. 25, 2004

(30) Foreign Application Priority Data

Sep. 19, 2002 (JP) .............................. 2002-273062

(51) Int. Cl.
*G06K 9/00* (2006.01)
(52) U.S. Cl. ...................... 382/154; 382/199
(58) Field of Classification Search ..................... None
See application file for complete search history.

(56) References Cited

U.S. PATENT DOCUMENTS

| | | | | |
|---|---|---|---|---|
| 6,370,262 B1* | 4/2002 | Kawabata | ................... | 382/106 |
| 6,987,864 B2* | 1/2006 | Nishigaki et al. | ........... | 382/104 |

FOREIGN PATENT DOCUMENTS

| JP | 2000-329852 | 11/2000 |
|---|---|---|
| JP | 2001-101428 | 4/2001 |
| JP | 2001-118200 | 4/2001 |

OTHER PUBLICATIONS

Patent Abstract of Japan, Publication No. 2000329852 A, Published on Nov. 30, 2000, in the name of Shimomura Tomoko.
Patent Abstract of Japan, Publication No. 2001101428 A, Published on Apr. 13, 2001, in the name of Babasaki Masahiro.
Patent Abstract of Japan, Publication No. 2001118200 A, Published on Apr. 27, 2001, in the name of Honda Kanako.

* cited by examiner

*Primary Examiner*—Bhavesh M Mehta
*Assistant Examiner*—Charles Kim
(74) *Attorney, Agent, or Firm*—Christie, Parker & Hale, LLP

(57) ABSTRACT

A method for image processing that compensates for inconsistent edge detection. A field of view of a camera is segmented in the form of a matrix by angle and by measured range value based on parallax; matrix data is calculated for a segment where a detected edge exists, and for segments surrounding the segment, the calculated matrix data is then assigned to each of the segments; a search is made through the assigned matrix data to find a segment that has matrix data exceeding a predetermined threshold value. If, the detected edge exists in the found segment, edge data of the edge is taken to represent the position of an object.

18 Claims, 10 Drawing Sheets

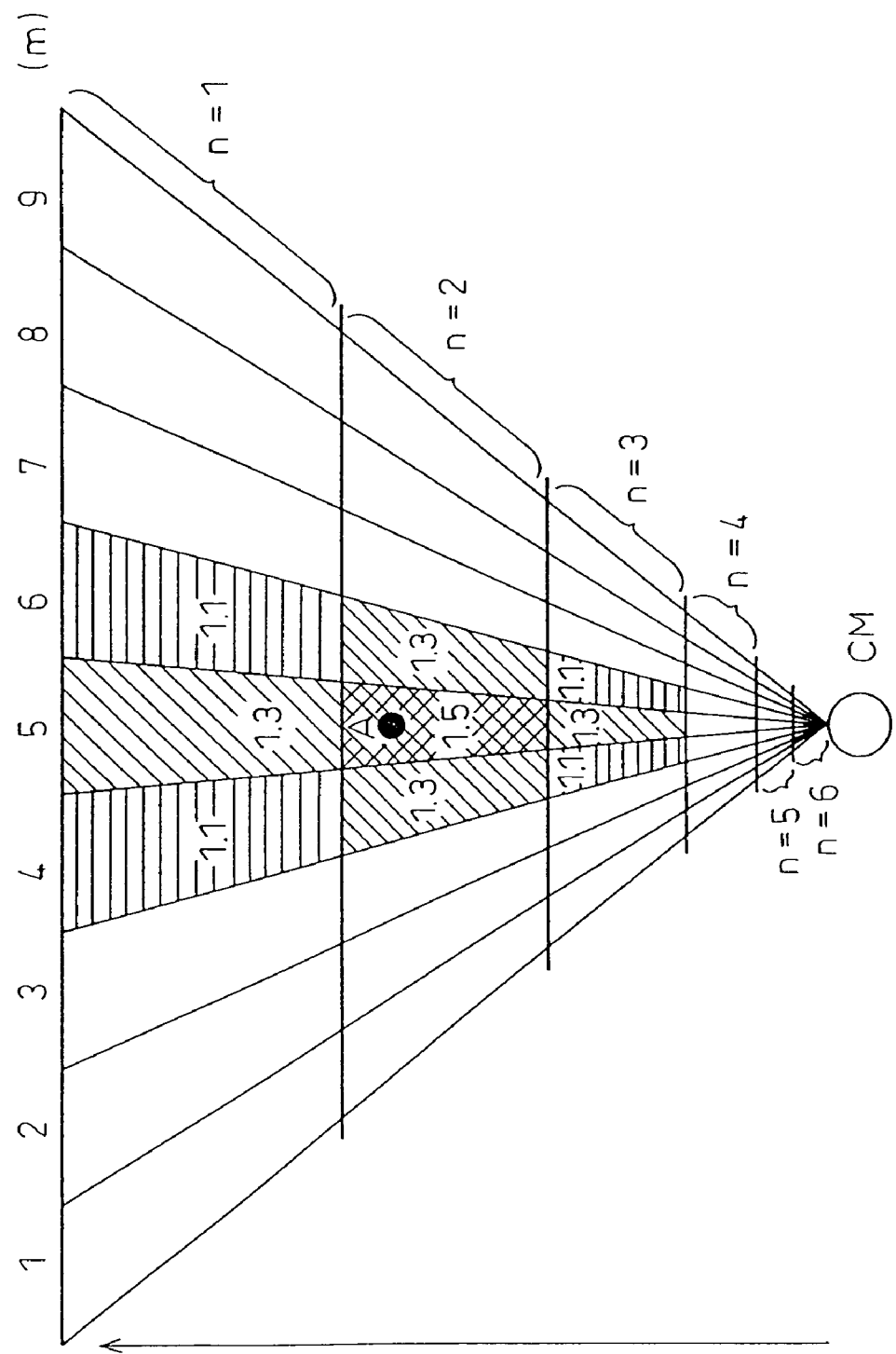

METHOD FOR PROCESSING AN IMAGE CAPTURED BY A CAMERA

CROSS REFERENCE TO RELATED APPLICATION

This application claims priority of Japanese patent application number 2002-273062, filed Sep. 19, 2002.

BACKGROUND OF THE INVENTION

1. Field of the Invention

The present invention relates to an image processing method capable of properly recognizing the road condition ahead, especially a vehicle or like object ahead, by processing an image captured by a camera mounted on a vehicle.

2. Description of the Related Art

In the conventional art, it is practiced to recognize a vehicle, or like object, ahead or make range measurements, etc. using an image captured by a camera. In this case, to recognize the vehicle or like object ahead, edge extraction is performed to obtain an edge image and, based on the obtained edge image, the range and angle to the vehicle or like object ahead are measured. Refer, for example, to Japanese Unexamined Patent Publication No. 2001-101428.

An edge is a contour line where the gray level of the image changes rapidly, and the advantage is that an edge remains relatively unaffected if the gray level changes due to a shadow or stain. In edge extraction, either vertical or horizontal edges, or both vertical and horizontal edges, can be extracted.

When performing edge detection in image processing, either vertical or horizontal edges, or both vertical and horizontal edges, are detected using, for example, cameras arranged on the left and the right, and the range and angle to the target object are measured. However, depending on camera noise or surrounding conditions, edges may not appear at constant positions and, when detecting edges at predetermined intervals of time, it is often not possible to detect edges consistently. For example, an edge of a particular portion of a vehicle traveling ahead may not appear at a certain instant in time or may not appear at a constant position, making it impossible to consistently detect the edge of that portion.

It is accordingly an object of the present invention to provide an image processing method that can compensate for such inconsistent edge detection.

SUMMARY OF THE INVENTION

According to the present invention, the field of view of a stereo camera is segmented in the form of a matrix by angle and by measured range value based on parallax, and matrix data is calculated for a segment where a detected edge exists, and also for segments surrounding the segment, the calculated matrix data then being assigned to each of the segments; then, a search is made through the assigned matrix data to find a segment that has matrix data exceeding a predetermined threshold value, and if the detected edge exists in the thus found segment, edge data of the edge is taken to represent the position of an object.

If the edge does not exist in the thus found segment, then the threshold value is successively increased, a search is made successively to find a segment that has matrix data exceeding the increased threshold value and, if an edge detected at a past point in time corresponding to the increased threshold value exists in the thus found segment, edge data of the edge is taken to represent the position of an object.

As the matrix data is used in addition to the detected edge data, as described above, the present invention can reliably detect the position (range and angle) of the object. Further, even when the edge detected at a particular position is not detected at a certain instant in time, the position (range and angle) of the object can be consistently detected by using the matrix data.

BRIEF DESCRIPTION OF THE DRAWINGS

The above object and features of the present invention will be more apparent from the following description of the preferred embodiments with reference to the accompanying drawings, wherein:

FIG. 13 is a diagram showing how a coefficient is assigned to each matrix segment.

DESCRIPTION OF THE PREFERRED EMBODIMENTS

Figure 1:
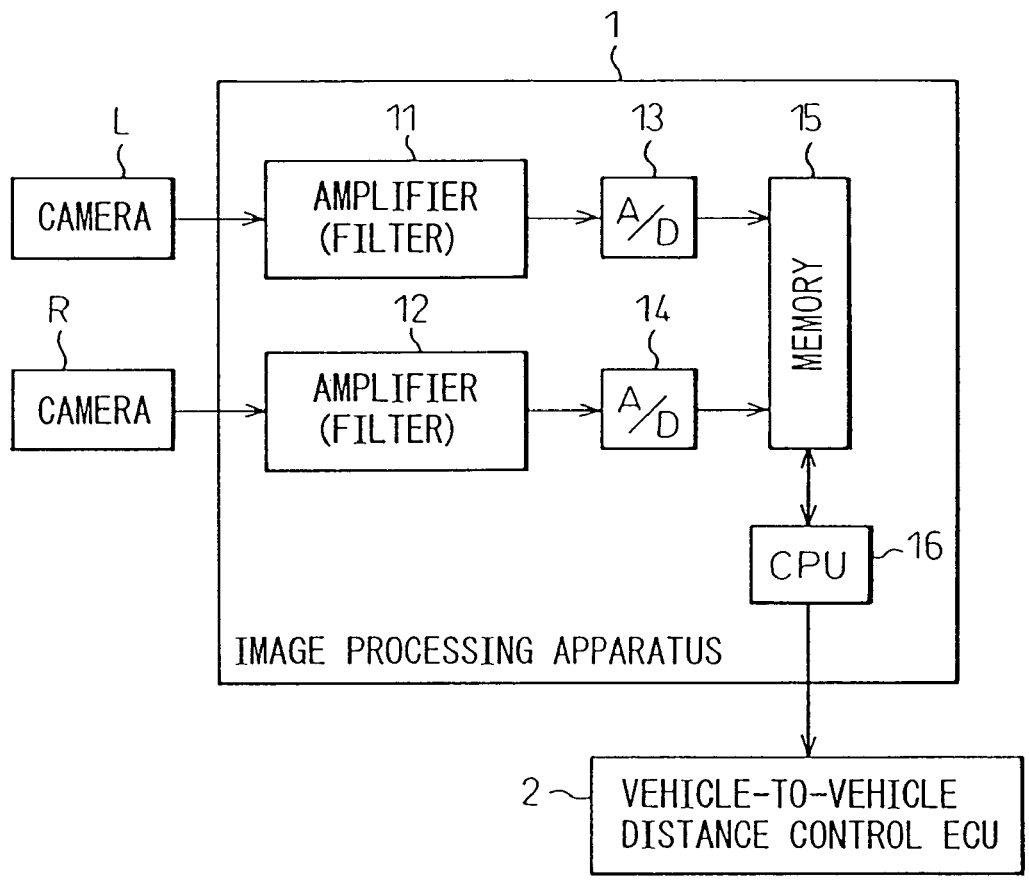
FIG. 1 is a block diagram showing the configuration of an image processing apparatus according to the present invention.

FIG. 1 is a block diagram showing the configuration of an image processing apparatus used to implement the image processing method of the present invention. The image processing apparatus 1 is equipped with a pair of left and right cameras L and R for capturing images in the path ahead, and measures the distance stereographically by using the images captured by the cameras L and R. More specifically, the distance to the target object in front, for example, a vehicle traveling ahead, is measured using the two cameras, and vehicle-to-vehicle distance control, etc. is performed to maintain a constant distance to the vehicle ahead.

Image data obtained from the cameras L and R are amplified by respective amplifiers 11 and 12, and band-limited by respective filters; the image data are then input to respective A/D converters 13 and 14, and stored in a memory 15. The image data stored in the memory 15 are processed by a CPU 16, and used by a vehicle-to-vehicle distance control unit (ECU) 3 for such purposes as vehicle-to-vehicle distance control to control the distance from the vehicle ahead. The CPU 16 processes the image data obtained from the cameras L and R, and obtains information such as the distance, detection angle, height, width, etc. of the object located ahead such as the vehicle traveling ahead.

Figure 2:
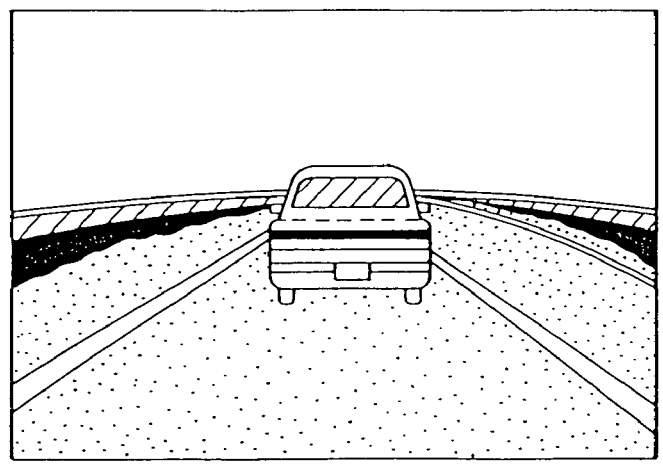
FIG. 2 is a diagram showing an image captured by a camera.
Figure 3:
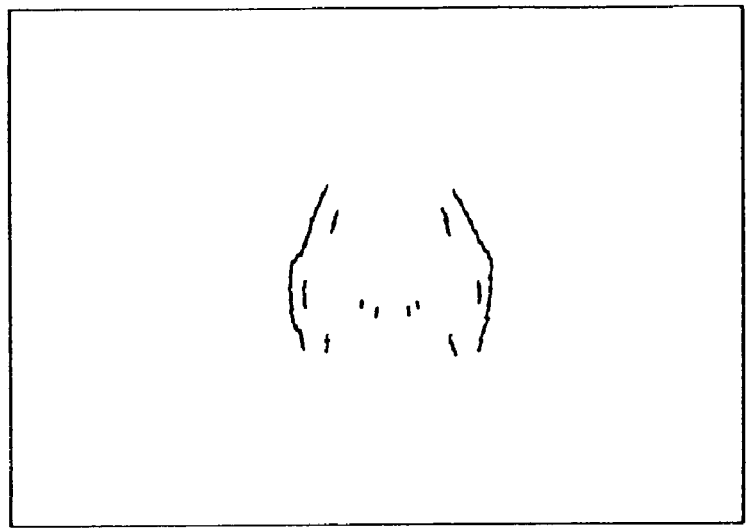
FIG. 3 is a diagram showing vertical edges extracted from the image captured by the camera.

FIG. 2 is a diagram showing an image captured by a camera. FIG. 3 is a diagram showing vertical edges extracted from the image captured by the camera shown in FIG. 2. In FIG. 3, only the vertical edges of the vehicle ahead are depicted, but the vertical edges of lanes can also be extracted.

Edge information is information generated by extracting points where the gray level of the image changes, while range (distance) information is information generated by comparing images captured by a multiocular camera and thereby obtaining the parallax for range measurement. Edge information can also be obtained from an image captured by a monocular camera; in this case also, pattern recognition can be done, and the approximate distance to the target object and the position and angle of the object's position can be determined.

Figure 4:
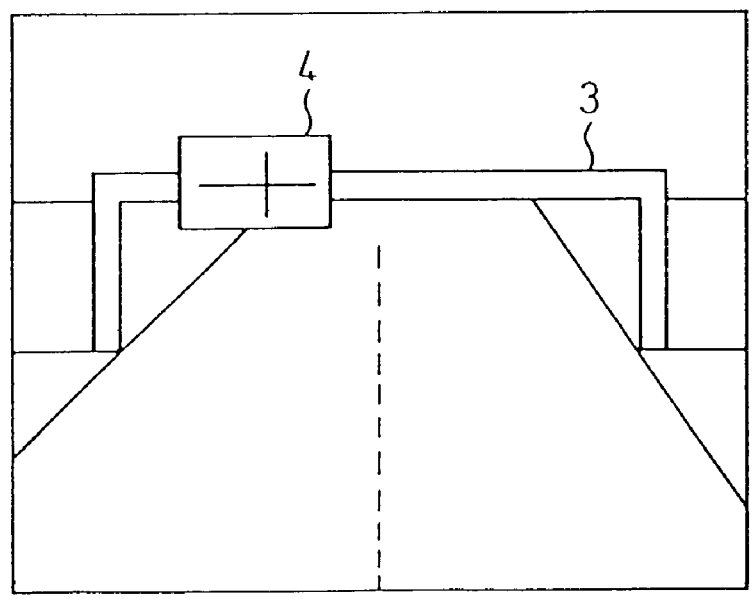
FIG. 4 is a diagram showing an image captured by the camera.
Figure 5:
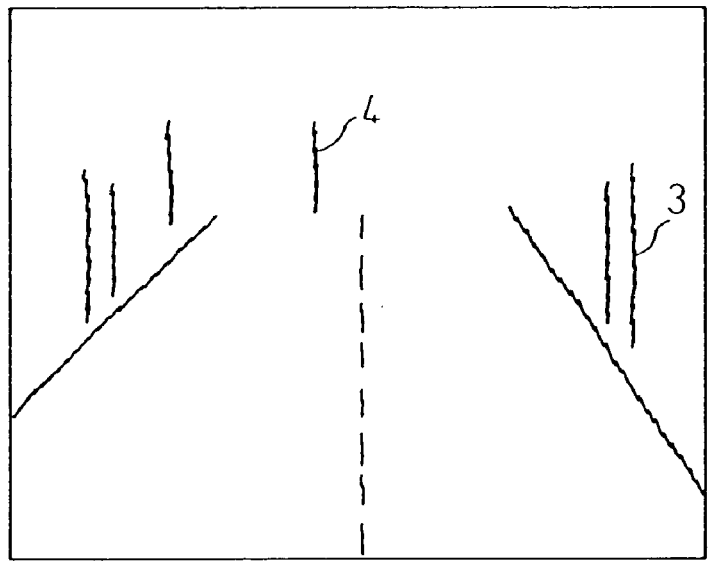
FIG. 5 is a diagram showing vertical edges extracted from the image captured by the camera.
Figure 6:
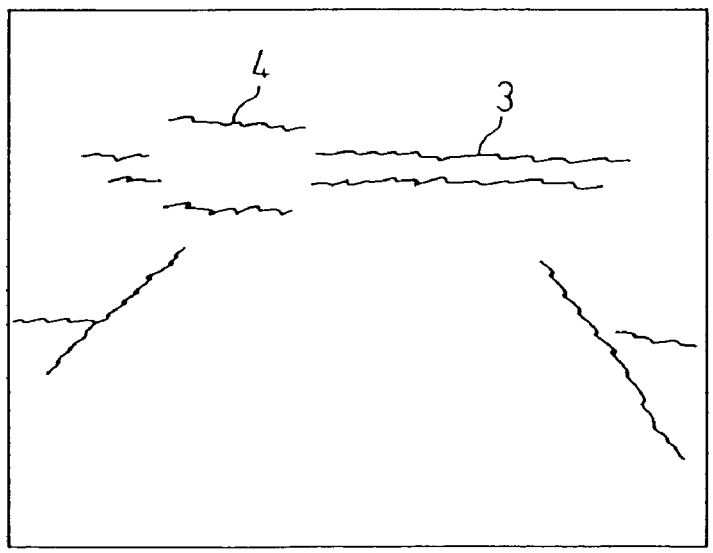
FIG. 6 is a diagram showing horizontal edges extracted from the image captured by the camera.

FIG. 4 is a diagram showing an image captured by the camera when an overhead bridge 3 with a road sign 4 attached thereto is located ahead. FIG. 5 is a diagram showing an edge image generated by extracting vertical edges from the image shown in FIG. 4. When the vertical edges are extracted, only lines showing the piers of the bridge 3 and the vertical sides of the road sign 4 appear, as shown in the figure. Horizontal edges of the image can likewise be extracted. FIG. 6 is a diagram showing an edge image generated by extracting horizontal edges from the image shown in FIG. 4.

Figure 7:
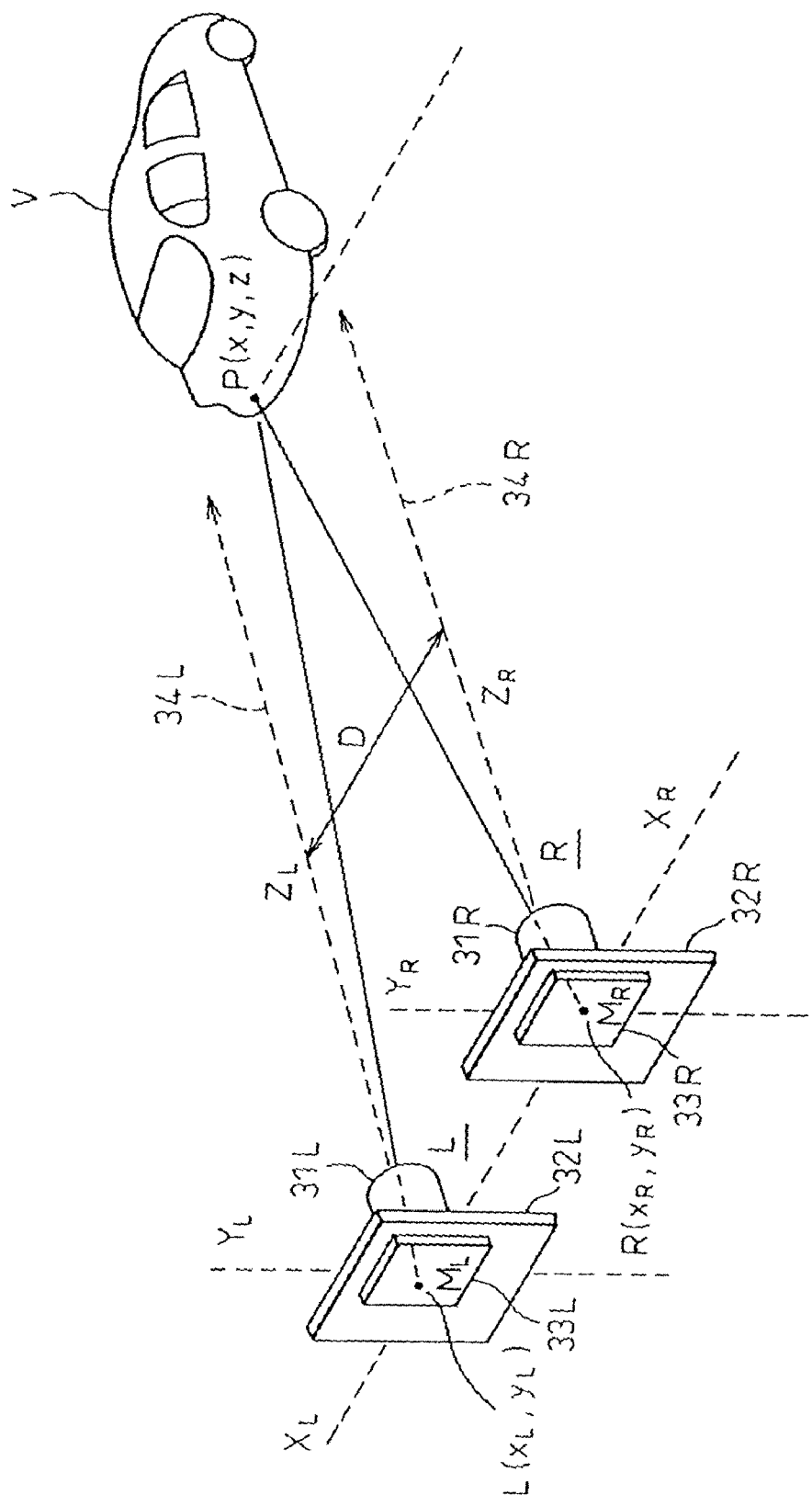
FIG. 7 is a diagram showing the principle of how the distance from the cameras to the target object is determined using stereoscopic images in the image processing apparatus shown in FIG. 1.

FIG. 7 is a diagram showing the principle of how the distance from the cameras to the target object is determined using stereoscopic images in the image processing apparatus shown in FIG. 1. The left and right cameras L and R respectively comprise imaging devices 33L and 33R, each constructed from a sensor chip formed on a camera substrate 32L or 32R, respectively, and lenses 31L and 31R for focusing an image of a vehicle V ahead onto the respective imaging devices. Reference numerals 34L and 34R are the optical axes of the respective cameras L and R, extending parallel to each other, and D is the distance between the two cameras.

Here, the axis extending in a horizontal direction and parallel to the plane of the imaging devices 33L and 33R is denoted as X axis, the axis extending in a vertical direction and parallel to the plane of the imaging devices 33L and 33R is denoted as Y axis, the axis extending in the same direction as the optical axes is denoted as Z axis, and the position of the target object V is designated by p(x, y, z); then, the distance z from the cameras to the target object V can be expressed by the following equation.

$$z = f \cdot D/(x_L - x_R) = f \cdot D/S$$

In the above equation, f is the focal distance, and D is the distance between the two cameras. Further, $x_L - x_R = S$ is the parallax, $(x_L, y_L)$ is the position of the point at which the position p is imaged on the image ML captured by the camera L, and $(x_R, y_R)$ is the position of the point at which the position p is imaged on the image MR captured by the camera R. When the horizontal axes of the imaging planes are aligned on the same line as shown in FIG. 7, the parallax $S = x_L - x_R$. The focal length f, the parallax S, and $x_L$, $x_R$ are expressed in terms of the number of pixels, while the distance D between the two cameras and the distance (range) z are both expressed in meters.

Figure 8:
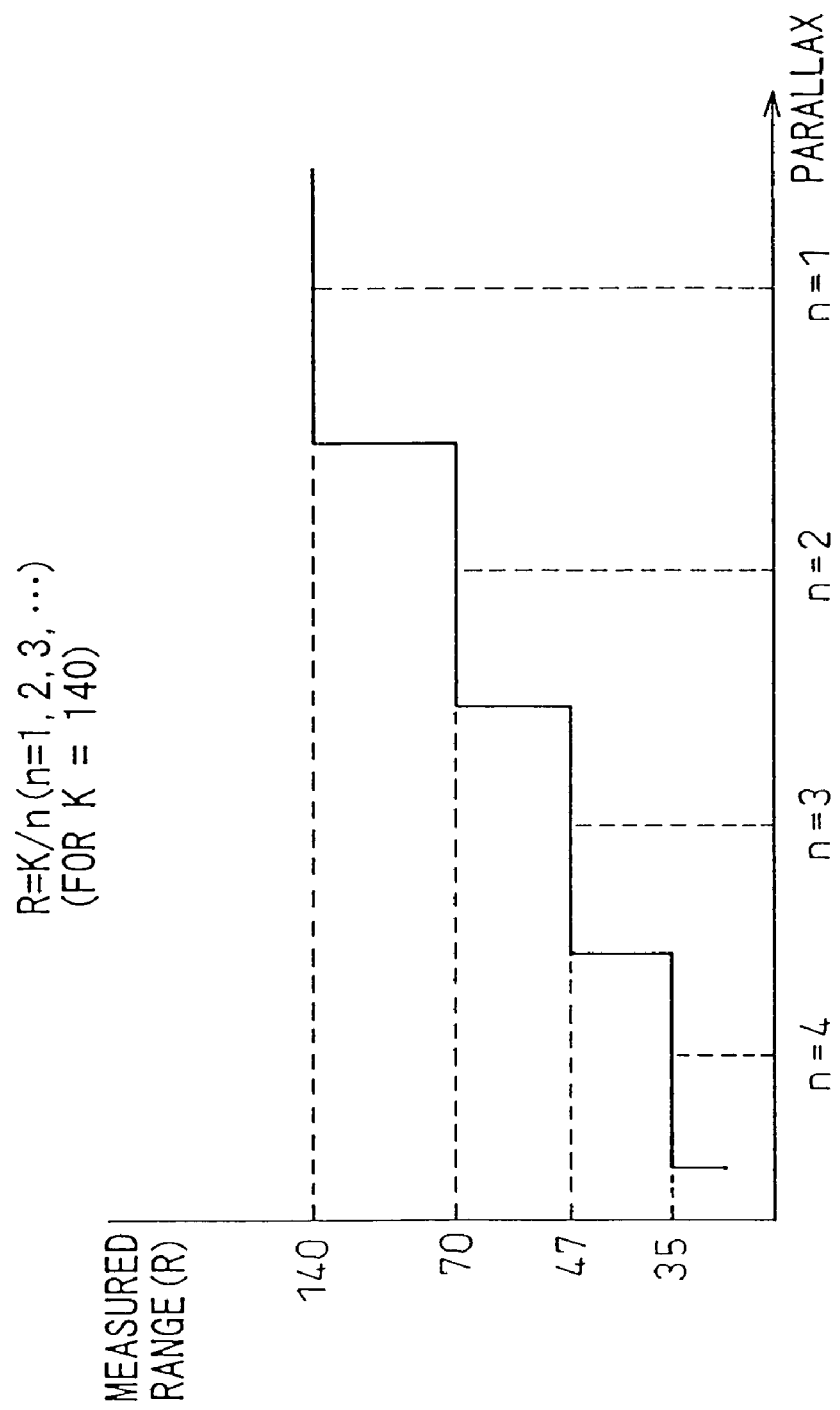
FIG. 8 is a diagram showing the parallax versus measured range relationship for constructing a matrix to be used in the present invention.

FIG. 8 is a diagram showing the relationship between the parallax and the measured distance (measured range) for constructing a matrix to be used in the present invention. The measured range value R is given as $R = K/n$. Here, K is a constant determined by the parameters of the stereo camera, and n is the parallax. FIG. 8 shows the case of $K = 140$. The parallax n increases as the range to the object decreases. Accordingly, as the parallax value decreases, the measured range value R increases.

The measured range value R thus changes as the parallax value changes but, in the present invention, the measured range value R for an integer value of the parallax n is taken as the measured range value R for a given range of parallax values centered about that integer value, and the measured range value R is plotted as a staircase pattern. For example, the measured range value 70 for the parallax $n=2$ is taken to represent a set of measured range values for the parallax value range of $2.5 > n \geq 1.5$.

Figure 9:
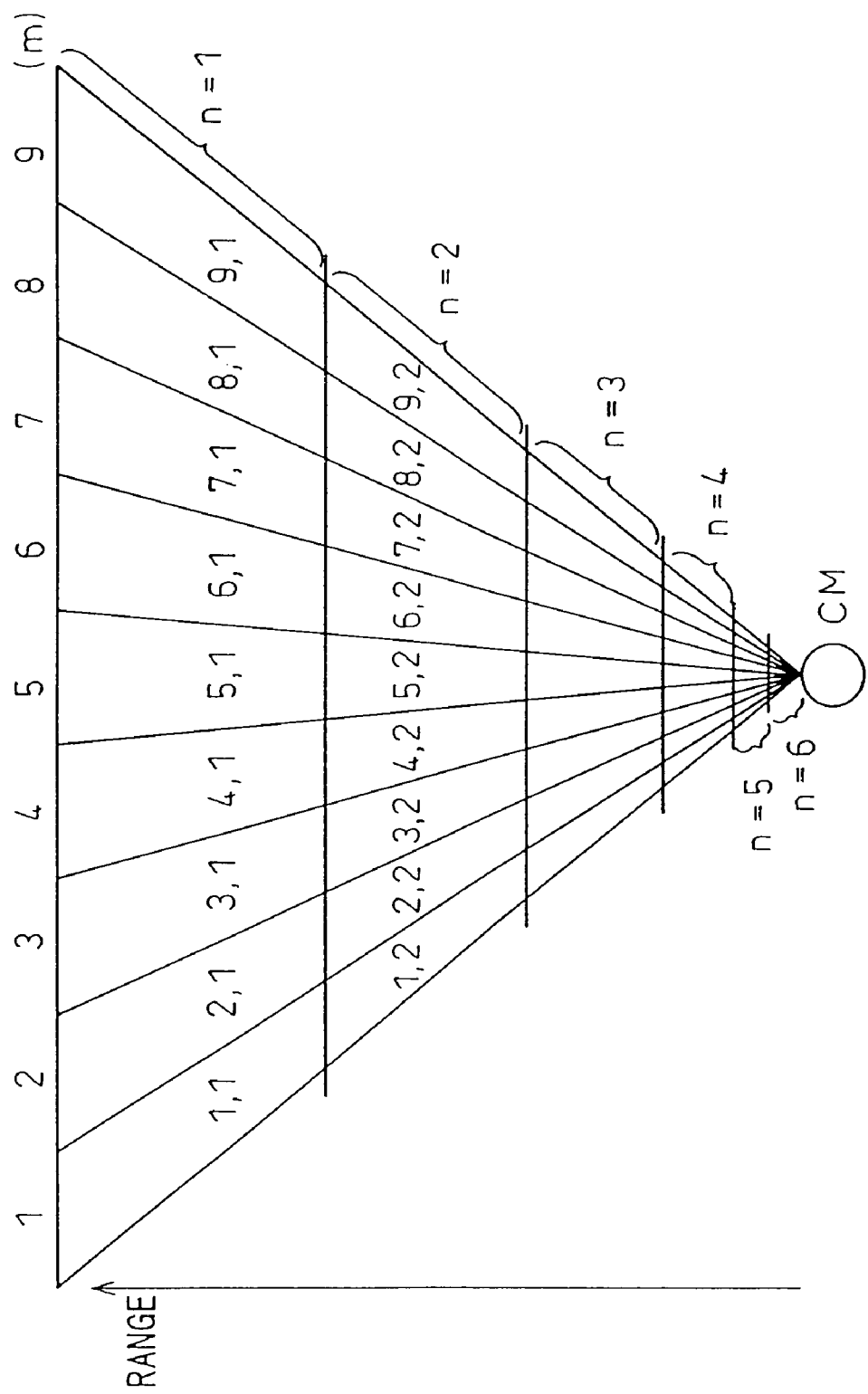
FIG. 9 is a diagram depicting the matrix to be used in the present invention.

FIG. 9 is a diagram depicting the matrix to be used in the present invention. As shown, the field of view of the camera CM spreads out radially. The field of view is divided into segments along the range direction in accordance with the measured range values for the respective integer values of the parallax n shown in FIG. 8. For example, the farthest segment in FIG. 9 is the segment for $n=1$, and the next farthest segment is the segment for $n=2$.

On the other hand, the angle of the field of view of the camera CM is divided into segments of equal angle (for example, 5°) and, based on the thus divided range and angle, the field of view of the camera is segmented in the form of a matrix and coordinates are assigned to each of these matrix segments. FIG. 9 shows an example of how coordinates are assigned to the respective segments. As shown, coordinates M(m, n), defined by the number m based on the divided angle (in the illustrated example, 1 to 9) and the range number n based on the parallax (in the illustrated example, 1 to 6), are assigned to each segment of the matrix. For example, the segment whose angle number is "5", and whose range number based on the parallax is "1", is assigned the coordinates M(5, 1).

In the present invention, matrix data is calculated and assigned to each matrix segment specified by the above-defined coordinates, and the matrix data is used as an index for determining the presence or absence of an object.

Figure 10:
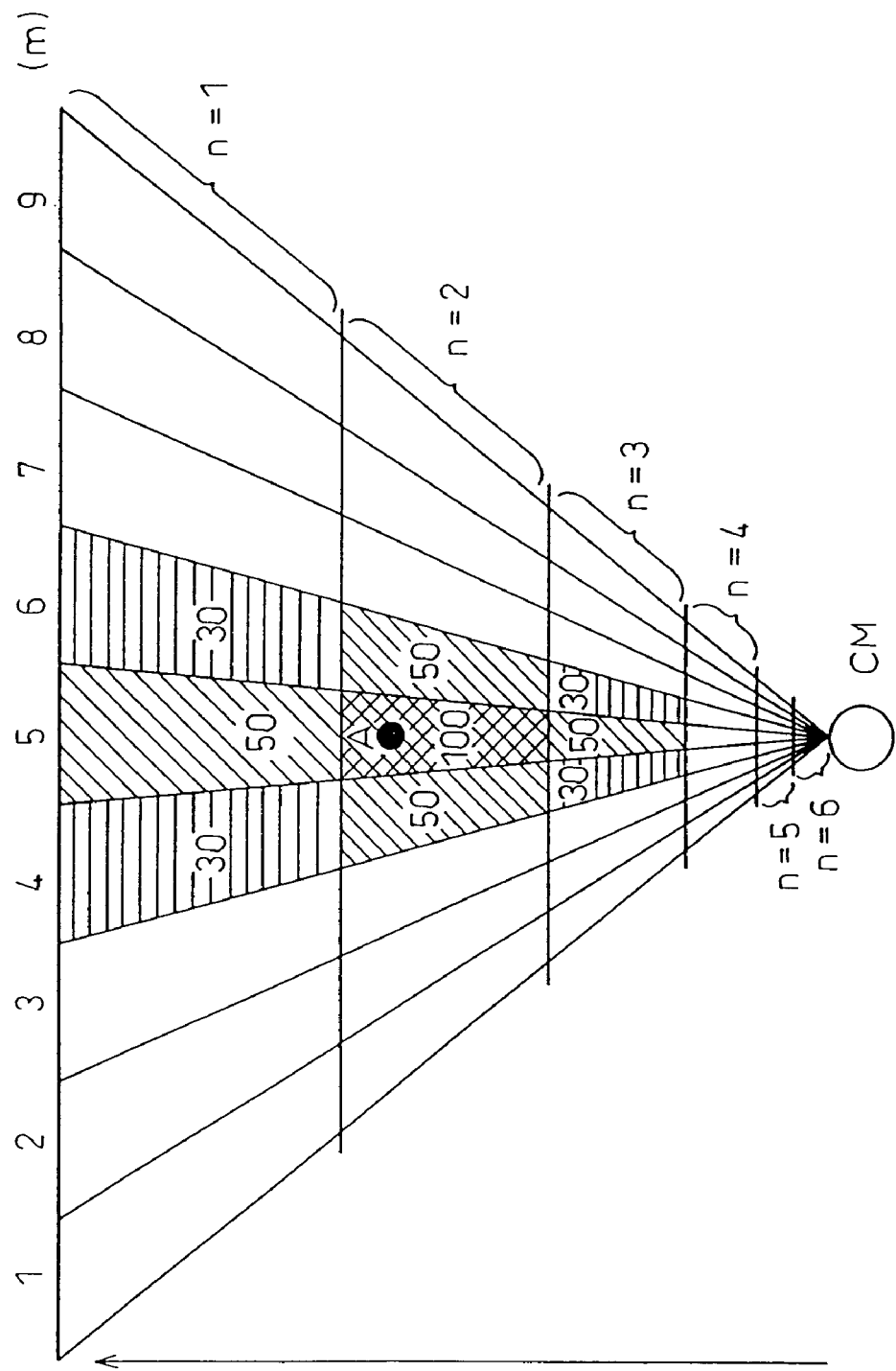
FIG. 10 is a diagram showing how matrix data is assigned to each matrix segment.

FIG. 10 is a diagram showing an example in which matrix data is actually assigned to each matrix segment formed by segmenting the field of view of the camera. The matrix data represents, as a numeric value, the frequency with which an object's edge appears for each matrix segment. For example, when an object's edge is detected at position A at a certain instant in time, 100 is assigned as matrix data to the matrix segment corresponding to that position, and 50 is assigned as matrix data to each of the matrix segments neighboring on the left, right, upper, and lower sides of that segment. Further, 30 is assigned as matrix data to each of the matrix segments neighboring on the diagonally upper and lower sides of the matrix segment corresponding to the position of the object A. In this way, the matrix data is accumulated by assigning matrix data to each matrix segment at predetermined intervals of time. If the object is not detected at a certain instant in time, the total value of the matrix data accumulated up to the last time is reduced, for example, by 50. Here, the lower limit of the total value of the matrix data is set to 0 to prevent the value from becoming smaller than 0. When the total value of the matrix data exceeds a predetermined value, then it is determined that an object exists in the position of that matrix segment.

On the other hand, when an edge is detected, the range and angle (edge data) of the detected edge are calculated, and the present and past edge data are stored; in this way, provisions are made to be able to detect the presence of the object consistently by using the present or past edge data of the edge located in the matrix segment the total value of whose matrix data has exceeded the predetermined value.

Figure 11:
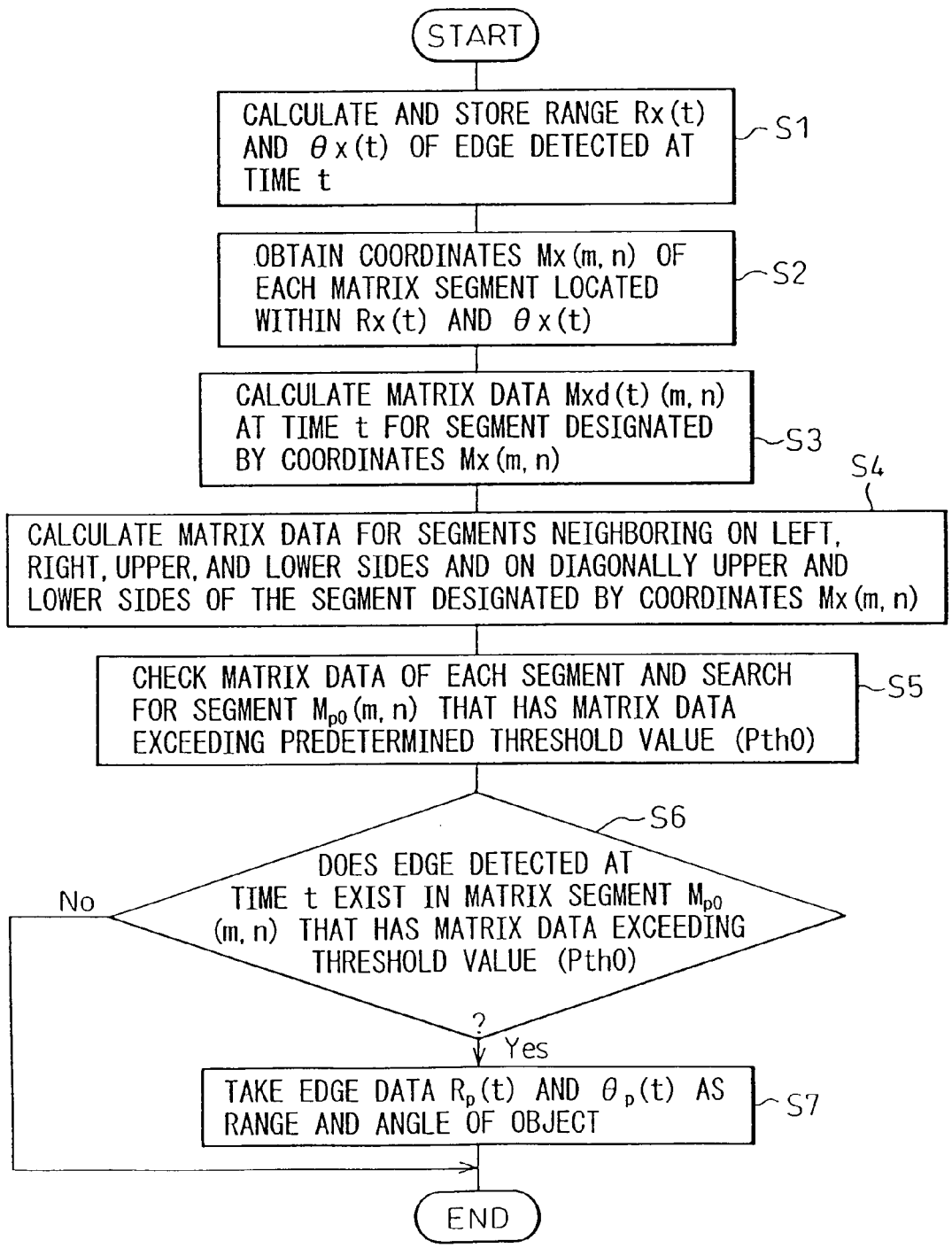
FIG. 11 is a flowchart showing one embodiment of the present invention.

FIG. 11 is a flowchart illustrating the operation of one embodiment of the image processing method according to the present invention. The operation illustrated here is controlled by the CPU 16 of the image processing apparatus 1 shown in FIG. 1. First, an edge of a vehicle traveling ahead is detected by the camera at time t, and the range R(t) and detection angle θ(t) (edge data) of the detected edge are calculated and stored in the memory (S1). The number of edges detected here is not limited to one; therefore, the range Rx(t) and detection angle θx(t) of each edge detected at time t are calculated and stored in the memory. Here, x designates each detected edge. Next, from the range Rx(t) and detection angle θx(t) of each edge detected at time t, the coordinates Mx(m, n) of each matrix segment located within that range and angle are obtained (S2). Then, the matrix data Mxd(t) (m, n) at time t for the segment designated by the coordinates Mx(m, n) is calculated by the following equation (S3).

$$Mxd(t)(m, n) = Mxd(t-1)(m, n) + P$$

In the above equation, Mxd(t−1) is the total value of the matrix data accumulated up to the last detection cycle for the matrix segment where the detected edge exists, and P is the matrix data to be newly added to the matrix segment where the detected edge exists. According to the example shown in FIG. 10, "100" is added as the value of P. The matrix data obtained by the above calculation is assigned to the matrix segment.

Next, the matrix data is calculated for each of the segments neighboring on the left, right, upper, and lower sides of the above matrix segment, and the matrix data obtained by the calculation are respectively assigned to the matrix segments neighboring on the left, right, upper, and lower sides (S4).

For example, the matrix data for the matrix segment neighboring on the left side is calculated as shown below.

$$(\text{Left neighbor}) Mxd(t)(m-1, n) = Mxd(t-1)(m-1, n) + (P/2)$$

In the above equation, Mxd(t)(m−1, n) is the matrix data to be obtained, Mxd(t−1)(m−1, n) is the value of the matrix data assigned to that segment up to the last detection cycle, and P/2 is the matrix data to be newly added. According to the example shown in FIG. 10, P/2=50.

Similarly, the matrix data for the matrix segments neighboring on the right, upper, and lower sides, respectively, are calculated as shown below.

$$(\text{Right neighbor}) Mxd(t)(m+1, n) = Mxd(t-1)(m+1, n) + (P/2)$$

$$(\text{Upper neighbor}) Mxd(t)(m, n-1) = Mxd(t-1)(m, n-1) + (P/2)$$

$$(\text{Lower neighbor}) Mxd(t)(m, n+1) = Mxd(t-1)(m, n+1) + (P/2)$$

At the same time, the matrix data is calculated for each of the matrix segments neighboring on the diagonally upper and lower sides of the above matrix segment, and the matrix data obtained by the calculation are respectively assigned to the diagonally neighboring matrix segments (S4).

For example, the matrix data for the matrix segment diagonally neighboring on the upper left side is calculated as shown below.

$$(\text{Upper left neighbor}) Mxd(t)(m-1, n-1) = Mxd(t-1)(m-1, n-1) + (P/3)$$

According to the example shown in FIG. 10, P/3=30.

Similarly, the matrix data for the matrix segments diagonally neighboring on the upper right, lower left, and lower right sides, respectively, are calculated as shown below.

$$(\text{Upper right neighbor}) Mxd(t)(m+1, n-1) = Mxd(t-1)(m+1, n-1) + (P/3)$$

$$(\text{Lower left neighbor}) Mxd(t)(m-1, n+1) = Mxd(t-1)(m-1, n+1) + (P/3)$$

$$(\text{Lower right neighbor}) Mxd(t)(m+1, n+1) = Mxd(t-1)(m+1, n+1) + (P/3)$$

In the above example, P, P/2, and P/3 are added, but instead, prescribed matrix data P1, P2, and P3 (where P1 >P2>P3) may be added. If the object is not detected at a certain instant in time, predetermined matrix data is subtracted.

Next, the matrix data of each matrix segment is checked to search for a matrix segment Mp0 (m, n) that has matrix data exceeding a predetermined threshold value Pth0 (S5); then, it is determined whether the edge detected at time t exists in the segment Mp0 (m, n) (S6). If it does, the edge data of that edge is taken to represent the position of the object. The edge data here means the edge data Rp(t) and θp(t) of the edge existing in the matrix segment Mp0 (m, n), taken from among the range Rx(t) and angle θx(t) of each edge detected at time t and stored in S1. Of the data detected in S1, the edge data Rp(t) and θp(t) is the edge data of the edge existing in the segment whose matrix data exceeds the predetermined threshold value, and therefore, the data of the edge whose presence is consistently detected. Besides the edge data of the edges detected at time t, the data of the edges detected at times t−1, t−2, . . . , t−n are also stored.

If it is determined in S6 that the edge exists in the segment Mp0 (m, n) (Yes), its edge data Rp(t) and θp(t) are taken as the range and angle of the object. If the opposite is true in S6, the process is terminated, and the same flow is repeated.

Figure 12:
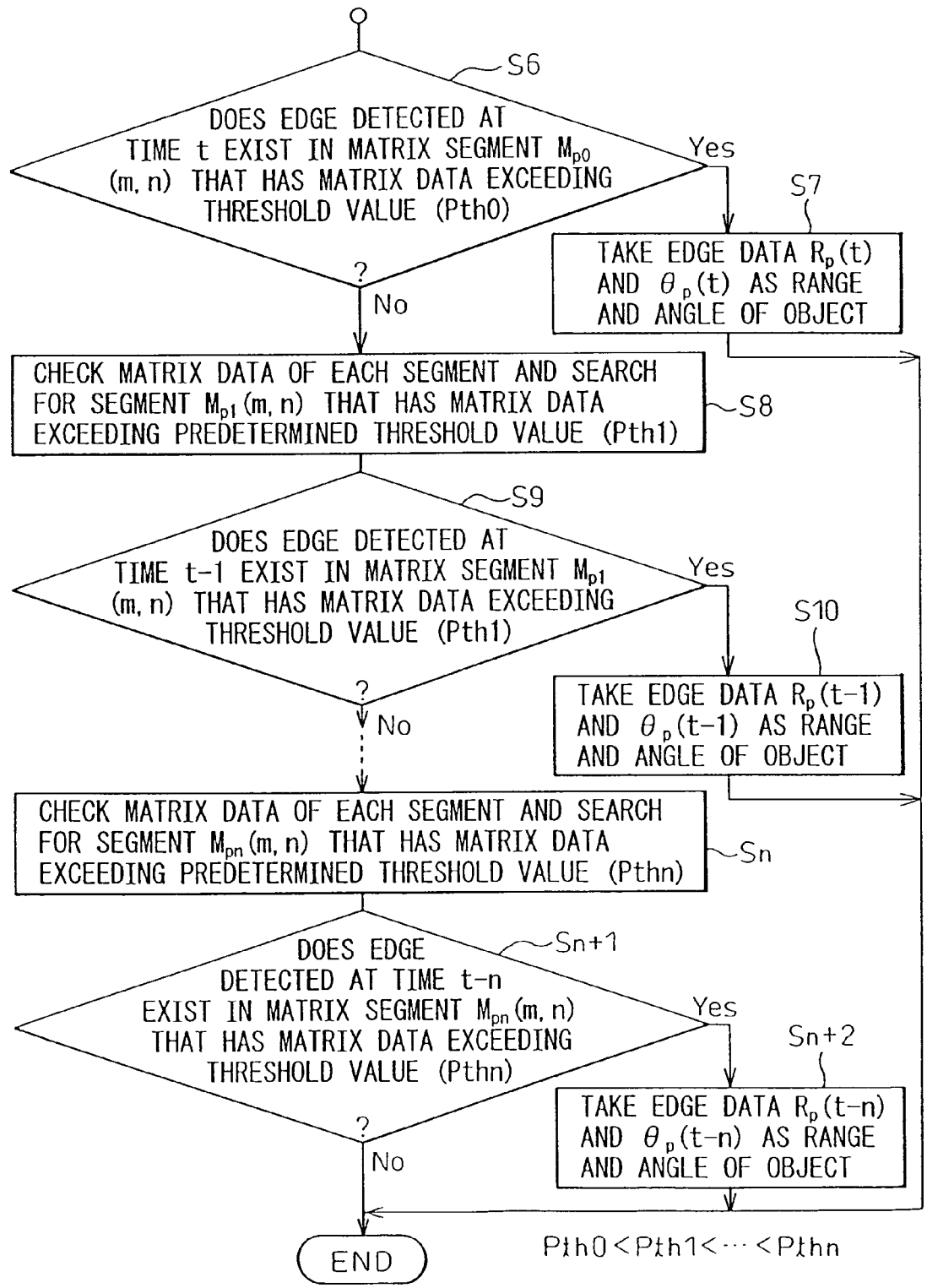
FIG. 12 is a flowchart showing another embodiment of the present invention.

FIG. 12 is a flowchart illustrating the operation of another embodiment of the image processing method according to the present invention. The process up to S6 is the same as that shown in FIG. 11. If the edge detected at time t exists in the segment Mp0 (m, n) in S6, the process proceeds to S7, as in the embodiment of FIG. 11.

In the embodiment of FIG. 12, on the other hand, if the edge data detected at time t does not exist in the matrix segment Mp0 (m, n) whose matrix data exceeds the predetermined threshold value Pth0 (No), the matrix data threshold value is increased, and a search is made to find a segment that exceeds the thus increased threshold value; then, it is determined whether the edge detected last time (at time t−1) exists in the thus found segment that exceeds the increased threshold value. If it does, the edge data of that edge is taken to represent the position, i.e., the range and angle, of the object. If the edge detected last time (at time t−1) does not exist in the segment that exceeds the increased threshold value, the threshold value is further increased, and it is determined whether the edge detected two detection cycles back (at time t−2) exists. Thereafter, a similar process is repeated.

The operation of this embodiment will be described below with reference to the flowchart of FIG. 12. In the embodiment shown in FIG. 12, if the answer in S6 is No, the matrix data of each matrix segment is checked to search for a matrix segment Mp1 (m, n) that has matrix data exceeding a predetermined threshold value Pth1 (Pth1 >Pth0) (S8); then, it is determined whether the edge detected at time t−1 exists in the segment Mp1 (m, n) (S9). If it is determined that the edge detected at time t−1 exists (Yes), its edge data Rp(t−1) and θp(t−1) are taken as the range and angle of the object (S10). If, in S9, the edge does not exist (No), the threshold value is increased to Pth2 (Pth2>Pth1), and a similar process is repeated. If the edge does not exist, the threshold value is further increased. In Sn, the threshold value is increased to Pthn (Pthn> . . . >Pth1>Pth0), and a search is made for a matrix segment Mpn(m, n) that has matrix data exceeding the threshold value Pthn (Sn); then, it is determined whether the edge detected at time t−n exists in the segment Mpn(m, n) (Sn+1). If it is determined that the edge detected at time t−n exists (Yes), its edge data Rp(t−n) and θp(t−n) are taken as the range and angle of the object (Sn+2). If No in Sn+1, the process is terminated.

In the above embodiment, the process is repeated by successively increasing the threshold value Pth from Pth0 up to Pthn, but the number of repetitions can be set as desired.

In the above description, the range and angle of the object are detected using a pair of cameras, but it is also possible to detect the position (range and angle) of the object by using a monocular camera; in that case, a matrix is constructed based on the range to the object obtained from the upper and lower positions on the screen, and on the prescribed angle with which the field of view of the camera is divided, and the position of the object is detected using the matrix data in addition to the edge data.

In the above embodiments, when an edge is detected, the coordinates of each matrix located within its range and angle are obtained, and the matrix data is added by calculation. However, it is also possible to obtain the matrix data, for example, by multiplying with a coefficient Q as in $$Mxd(t)(m, n)=Mxd(t-1)(m, n) \times Q$$

FIG. 13 is a diagram showing an example in which a coefficient is actually assigned to each matrix segment when obtaining the matrix data by multiplication. For example, when an object's edge is detected at position A at a certain instant in time, the matrix data of the matrix segment corresponding to that position is multiplied by a coefficient 1.5. Likewise, the matrix data of each of the matrix segments neighboring on the left, right, upper, and lower sides is multiplied by a coefficient 1.3, while the matrix data of each of the matrix segments neighboring diagonally on the upper and lower sides is multiplied by a coefficient 1.1. As the calculation performed here is not an addition, the matrix data of each matrix segment is initially set, for example, to "1". Then, when an edge is detected, the matrix data of each matrix segment is multiplied by its corresponding coefficient shown in FIG. 13. If the object is not detected, each matrix data is multiplied, for example, by a coefficient 0.5. However, if the multiplication by 0.5 is repeated a number of times, the matrix data value will become so small that the value hardly increases even if it is multiplied by 1.5 when the object is detected; in view of this, when the matrix data becomes smaller than 1, the matrix data value is increased to "1". When obtaining the matrix data by multiplication as in this example, the "predetermined threshold value" shown in FIG. 11 is set, for example, to "5".

What is claimed is:

1. A method for image processing comprising:
   segmenting a field of view of a stereo camera in the form of a matrix by angle and by measured range value based on parallax;
   calculating matrix data for a segment where a detected edge exists and for segments surrounding said segment;
   assigning said calculated matrix data to each of said segments;
   searching through said assigned matrix data to find a segment that has matrix data exceeding a predetermined threshold value; and
   representing the position of an object by edge data of said edge, when said detected edge exists in said found segment,
   wherein said calculated matrix data is a value calculated by adding the matrix data for a present cycle of detection to a total value of the matrix data accumulated up to last cycle of detection.

2. A method for image processing as claimed in claim 1, wherein, when said edge is not detected, said calculated matrix data is a value calculated by subtracting predetermined matrix data from the total value of the matrix data accumulated up to the last cycle of detection.

3. A method for image processing as claimed in claim 1, wherein, when the value of the matrix data to be added to the segment where said edge exists is denoted by P1, then the value of the matrix data to be added to each of the segments neighboring on left, right, upper, and lower sides of said segment is denoted by P2, and the value of the matrix data to be added to each of the segments neighboring on diagonally upper and lower sides of said segment is denoted by P3, where P1>P2>P3.

4. A method for image processing comprising:
   segmenting a field of view of a stereo camera in the form of a matrix by angle and by measured range value based on parallax;
   calculating matrix data for a segment where a detected edge exists and for segments surrounding said segment;
   assigning said calculated matrix data to each of said segments;
   searching through said assigned matrix data to find a segment that has matrix data exceeding a predetermined threshold value; and
   representing the position of an object by edge data of said edge, when said detected edge exists in said found segment, wherein said calculated matrix data is a value calculated by multiplying a total value of the matrix data accumulated up to last cycle of detection, by a matrix coefficient greater than 1 for a present cycle of detection.

5. A method for image processing as claimed in claim 4, wherein, when said edge is not detected, said calculated matrix data is a value calculated by multiplying the total value of the matrix data accumulated up to the last cycle of detection, by a coefficient smaller than 1.

6. A method for image processing as claimed in claim 4, wherein, when the coefficient by which to multiply the matrix data of the segment where said edge exists is denoted by Q1, then the coefficient by which to multiply the matrix data of each of the segments neighboring on left, right, upper, and lower sides of said segment is denoted by Q2, and the coefficient by which to multiply the matrix data of each of the segments neighboring on diagonally upper and lower sides of said segment is denoted by Q3, where Q1>Q2>Q3.

7. A method for image processing comprising:
- segmenting a field of view of a stereo camera in the form of a matrix by angle and by measured range value based on parallax;
- calculating matrix data for a segment where a detected edge exists and for segments surrounding said segment;
- assigning said calculated matrix data to each of said segments;
- searching through said assigned matrix data to find a segment that has matrix data exceeding a predetermined threshold value; and
- representing the position of an object by edge data of said edge, when said detected edge exists in said found segment, wherein said edge data includes range and angle information.

8. A method for image processing comprising:
- segmenting a field of view of a monocular camera in the form of a matrix by angle and by range obtained from upper and lower positions on a screen;
- calculating matrix data for a segment where a detected edge exists and for segments surrounding said segment;
- assigning said calculated matrix data to each of said segments;
- searching through said assigned matrix data to find a segment that has matrix data exceeding a predetermined threshold value; and
- representing the position of an object by edge data of said edge, when said detected edge exists in said found segment, wherein said calculated matrix data is a value calculated by adding the matrix data for a present cycle of detection to a total value of the matrix data accumulated up to last cycle of detection.

9. A method for image processing comprising:
- segmenting a field of view of a stereo camera in the form of a matrix by angle and by measured range value based on parallax;
- calculating matrix data for a segment where a detected edge exists, and also for segments surrounding said segment;
- assigning said calculated matrix data to each of said segments,
- searching through said assigned matrix data to find a segment that has matrix data exceeding a predetermined threshold value;
- if said edge does not exist in said found segment, successively increasing said threshold value;
- further searching successively to find a segment that has matrix data exceeding said increased threshold value; and
- if an edge detected at a past point in time corresponding to said increased threshold value exists in said found segment, representing a position of an object by edge data of said edge.

10. A method for image processing as claimed in claim 9, wherein said matrix segmentation is done based on a prescribed angle and in accordance with measured range values for integer values of parallax.

11. A method for image processing as claimed in claim 9, wherein said calculated matrix data is a value calculated by adding the matrix data for a present cycle of detection to total value of the matrix data accumulated up to last cycle of detection.

12. A method for image processing as claimed in claim 11, wherein when said edge is not detected, said calculated matrix data is a value calculated by subtracting predetermined matrix data from total value of the matrix data accumulated up to last cycle of detection.

13. A method for image processing as claimed in claim 11, wherein when the value of the matrix data to be added to the segment where said edge exists is denoted by P1, then the value of the matrix data to be added to each of the segments neighboring on left, right, upper, and lower sides of said segment is denoted by P2, and the value of the matrix data to be added to each of the segments neighboring on diagonally upper and lower sides of said segment is denoted by P3, where P1>P2>P3.

14. A method for image processing as claimed in claim 9, wherein said calculated matrix data is a value calculated by multiplying the total value of the matrix data accumulated up to the last cycle of detection, by a matrix coefficient greater than 1 for the present cycle of detection.

15. A method for image processing as claimed in claim 14, wherein, when said edge is not detected, said calculated matrix data is a value calculated by multiplying total value of the matrix data accumulated up to last cycle of detection, by a coefficient smaller than 1.

16. A method for image processing as claimed in claim 14, wherein, when the coefficient by which to multiply the matrix data of the segment where said edge exists is denoted by Q1, then the coefficient by which to multiply the matrix data of each of the segments neighboring on left, right, upper, and lower sides of said segment is denoted by Q2, and the coefficient by which to multiply the matrix data of each of the segments neighboring on diagonally upper and lower sides of said segment is denoted by Q3, where Q1>Q2>Q3.

17. A method for image processing as claimed in claim 9, wherein said edge data includes range and angle information.

18. A method for image processing comprising:
- segmenting a field of view of a monocular camera in the form of a matrix by angle and by range obtained from upper and lower positions on a screen;
- calculating matrix data for a segment where a detected edge exists and for segments surrounding said segment;
- assigning said calculated matrix data to each of said segments;
- searching through said assigned matrix data to find a segment that has matrix data exceeding a predetermined threshold value;
- if said edge does not exist in said found segment, successively increasing said threshold value;
- further searching successively to find a segment that has matrix data exceeding said increased threshold value; and
- if an edge detected at a past point in time corresponding to said increased threshold value exists in said found segment, representing a position of an object by edge data of said edge.

* * * * *